(12) United States Patent
Klotz et al.

(10) Patent No.: US 6,889,649 B2
(45) Date of Patent: May 10, 2005

(54) VALVE FOR OPENING AND CLOSING A TUBE

(75) Inventors: Arthur Klotz, Remseck (DE); Helmut Neuschwander, Ludwigsburg (DE)

(73) Assignee: Mann & Hummel GmbH, Ludwigsburg (DE)

( * ) Notice: Subject to any disclaimer, the term of this patent is extended or adjusted under 35 U.S.C. 154(b) by 31 days.

(21) Appl. No.: 10/377,026

(22) Filed: Mar. 3, 2003

(65) Prior Publication Data

US 2003/0213456 A1 Nov. 20, 2003

(30) Foreign Application Priority Data

Mar. 1, 2002 (DE) .......................................... 102 09 180

(51) Int. Cl.$^7$ .......................... F02M 35/10; F16K 25/00
(52) U.S. Cl. ................... 123/184.55; 251/162
(58) Field of Search ...................... 123/184.55; 251/160, 251/162, 163

(56) References Cited

U.S. PATENT DOCUMENTS 2,501,635 A * 3/1950 Schmidt ..................... 251/163
5,901,677 A 5/1999 Ohrnberger et al.
6,138,628 A 10/2000 Alex et al.
6,598,853 B1 * 7/2003 Appleford et al. .......... 251/162

FOREIGN PATENT DOCUMENTS

DE 4344504 12/1993
WO WO 98/42966 10/1998

* cited by examiner

Primary Examiner—Noah P. Kamen
(74) Attorney, Agent, or Firm—Crowell & Moring LLP (57) ABSTRACT

A valve, particularly a switching cylinder, for opening and closing a pipe, especially for use in an intake manifold for a multi-cylinder internal combustion engine having an air distribution chamber and individual intake pipes positioned next to one another which terminate in a flange, in which the valve is positioned in an individual intake pipe to close or open the respective intake pipe, and the valve has at least one sealing system mounted in a radially movable manner such that, in the closed position, it presses against the pipe inner wall to form a seal, and in the open position and in the pivot range from the closed position to the open position, it forms a gap between the valve and the pipe inner wall.

7 Claims, 7 Drawing Sheets

VALVE FOR OPENING AND CLOSING A TUBE

BACKGROUND OF THE INVENTION

The present invention relates to a valve for opening and closing a tubular channel or pipe.

A valve in the form of a rotary slide valve for opening and closing individual intake ducts is known from German Patent Application 43 44 504 A1. The intake ducts are part of an intake manifold arrangement for a multicylinder internal combustion engine, particularly an engine having two rows of cylinders in a V-shaped arrangement. A tubular intake air distributor extends over the entire length of the multicylinder internal combustion engine. Individual ducts lead from this distributor to the cylinders of the two rows of cylinders. This construction is structurally complex and costly to produce. Further shorter individual intake pipes also extend from the intake air distributor and open into the first individual ducts. The second individual intake pipes may be switched by the rotary slide valve, which comprises a switching cylinder arranged in a lengthwise hole and switches the duct length. This switching cylinder has an opening for each individual duct, which may be brought into or out of alignment with the respective second individual duct by rotating the switching cylinder. In order to form a seal between the intake ducts or between neighboring openings, a circumferential groove is arranged on the switching cylinder in which an expanding piston ring is disposed, which presses sealingly against the wall of the lengthwise hole or against the inner wall of the sleeve. The friction, which arises as the switching cylinder is rotated, can be reduced through the use of suitable material pairings. The functional reliability of the switching is significantly impaired as a result of the friction.

Published International Patent Application No. WO 98/42966 discloses a switching cylinder designed particularly for use in an intake pipe system of a multicylinder internal combustion engine. The switching cylinder is used for closing and opening the individual intake pipes. Each individual intake pipe is provided with an associated sealing element, which is attached to the switching cylinder. Each sealing element comprises two, preferably parallel, sealing strips whose ends are connected to radially elastic annular seal elements, whereby the sealing strips press elastically against the intake or outlet opening of each individual intake pipe to the lengthwise hole in which the switching cylinder is received. The sealing elements do improve the seal performance, but this arrangement also fails to achieve friction-free rotation of the switching cylinder.

SUMMARY OF THE INVENTION

It is an object of the invention to provide an improved valve for opening and closing a tube.

Another object of the invention is to provide a valve for opening and closing a tube which has a comparatively simple structure.

A further object of the invention is to provide a valve for opening and closing a tube, which is relatively economical to manufacture.

It is also an object of the invention to provide a valve for opening and closing a tube which provides an effective seal between adjacent tubes switched by the valve.

Yet another object of the invention is to provide a valve for opening and closing a tube, which operates reliably with little or no friction.

These and other objects are achieved in accordance with the present invention by providing a valve for opening and closing a pipe, in which the valve comprises a switching cylinder provided with a sealing system mounted so as to be radially moveable such that when the switching cylinder is in a closed position, the sealing system is extended radially outwardly and pressed against an inner wall of the pipe to form a seal, and when the switching cylinder is in an open position and while the switching cylinder is pivoting between the closed position and the open position, the sealing system is retracted radially inwardly to form a gap between the sealing system and the pipe inner wall.

In accordance with a further aspect of the invention, the objects are achieved by providing a valve for opening and closing a pipe of an air intake system of a multicylinder internal combustion engine having a air distribution chamber and a plurality of individual intake pipes positioned next to one another and leading from the air distribution chamber to a flange attached to a cylinder head of the engine, said valve comprising a switching cylinder positioned in an individual intake pipe to close or open the individual intake pipe, in which the switching cylinder is provided with a sealing system mounted so as to be radially moveable such that when the switching cylinder is in a closed position, the sealing system is extended radially outwardly and pressed against an inner wall of the pipe to form a seal, and when the switching cylinder is in an open position and while the switching cylinder is pivoting between the closed position and the open position, the sealing system is retracted radially inwardly to form a gap between the sealing system and the pipe inner wall.

A significant advantage of the present invention is that the valve has a sealing system, which is mounted in such a way that no frictional forces arise as the valve is rotated. This is achieved in that the sealing system pivots away before commencing a rotational movement.

In one advantageous embodiment of the present invention, the sealing system is provided with a camshaft for effecting the radial movement, i.e., to release the sealing partner. The camshaft may be controlled by a servomotor or another actuator. There is also the possibility of providing the camshaft with teeth and to bring these teeth into engagement with a fixed gear ring.

As an alternative to the teeth, there is also the possibility of equipping the camshaft with a rocker arm. This rocker arm is brought into engagement with a control element, which causes rotation of the camshaft upon initiation of the closed setting and engages the sealing systems.

In accordance with a further development of the invention, the valve is used in an intake pipe system for a multicylinder internal combustion engine. The multicylinder internal combustion engine has an intake manifold and individual intake pipes positioned next one another, which end in a flange, the valve being positioned in each individual intake pipe and causing closing or opening.

The valve itself advantageously comprises at least two sealing strips which form a sealing system. The sealing strips extend parallel and their ends are connected to curved sealing elements. The sealing strips and curved elements are fixed in grooves of a switching cylinder.

These and other features of preferred embodiments of the invention, in addition to being set forth in the claims, are also disclosed in the specification and/or the drawings, and the individual features each may be implemented in embodiments of the invention either alone or in the form of subcombinations of two or more features and can be applied to other fields of use and may constitute advantageous, separately protectable constructions for which protection is also claimed.

BRIEF DESCRIPTION OF THE DRAWING

The invention will be described in further detail hereinafter with reference to illustrative preferred embodiments shown in the accompanying drawing figures, in which:

FIG. 7b is a detail view of the intake system of FIG. 7a having a closed output passage.

DETAILED DESCRIPTION OF PREFERRED EMBODIMENTS

Figure 1:
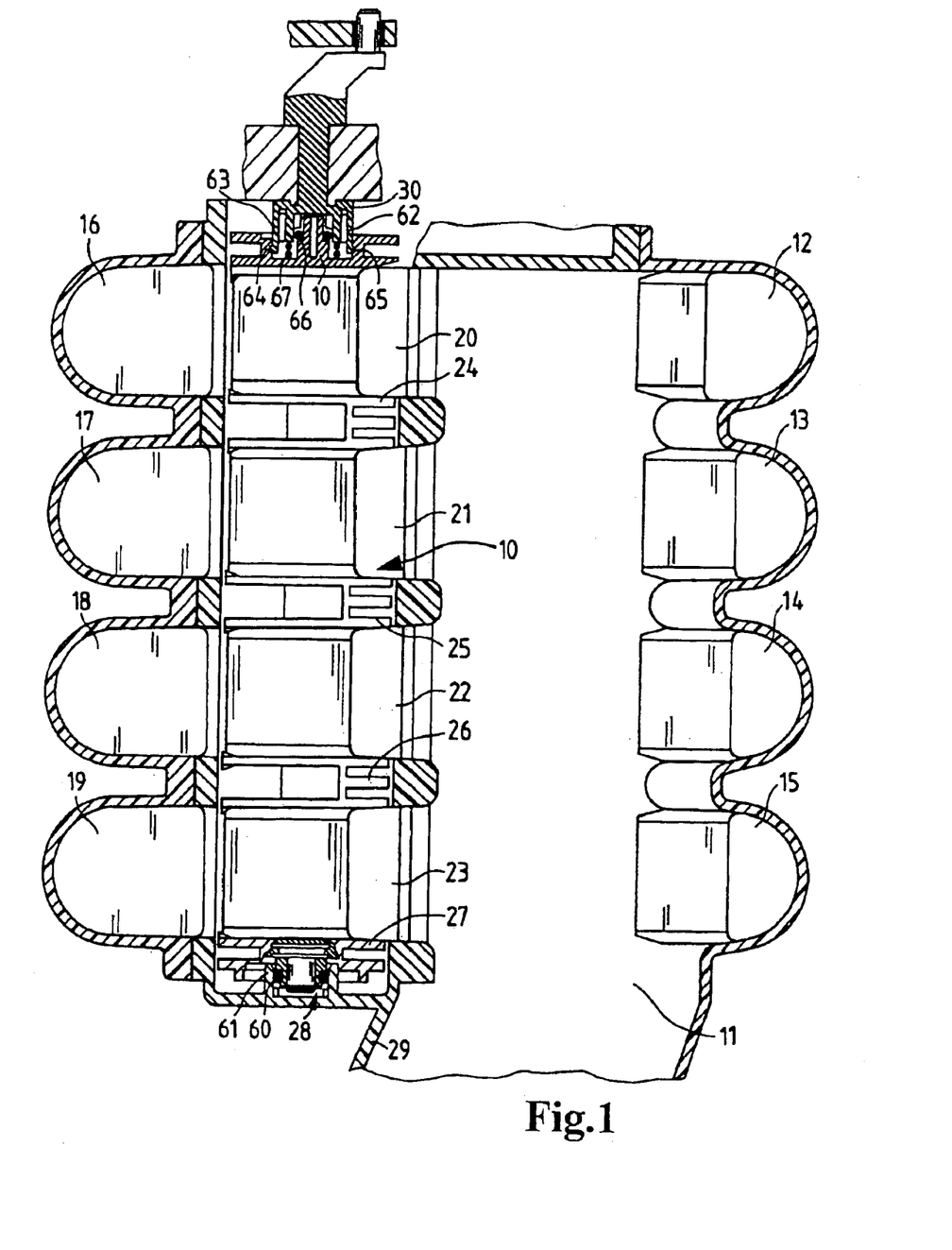
FIG. 1 shows a longitudinal sectional view of a switching cylinder in an intake manifold system.

FIG. 1 is a top view illustration of a switching cylinder 10 in an intake pipe system having an intake distribution chamber 11 for a four-cylinder internal combustion engine. Individual intake pipes 12, 13, 14, 15 extend from the distribution chamber 11 to a connecting flange (not shown) for attachment to an engine block. The switching cylinder 10 opens or closes outlet passages. These may comprise shorter individual intake pipes 16, 17, 18, 19, which also discharge through the connecting flange. The switching cylinder 10 is provided with openings 20, 21, 22 and 23. Support webs 24, 25, 26, 27 are located between these openings. The switching cylinder is mounted via a friction bearing 28 and a resilient element in the intake manifold housing 29. At the opposite end, the switching cylinder 10 is provided with a lever arm 30, by which the switching cylinder may be rotated into several different positions by an appropriate actuator (not shown).

The friction bearing 28 is resiliently mounted via an O-ring 60 in a recess 61 of the distribution chamber 11. Length tolerances may thus be compensated for. In addition, the resilient mounting ensures vibration damping. The lever arm 30 is equipped with legs 62 and 63, which engage in grooves 64, 65 and thus form a claw coupling. In addition, a resilient coupling is provided between the lever arm 30 and the switching cylinder 10 via an O-ring 66. A spring 67 ensures length tolerance compensation.

Figure 2:
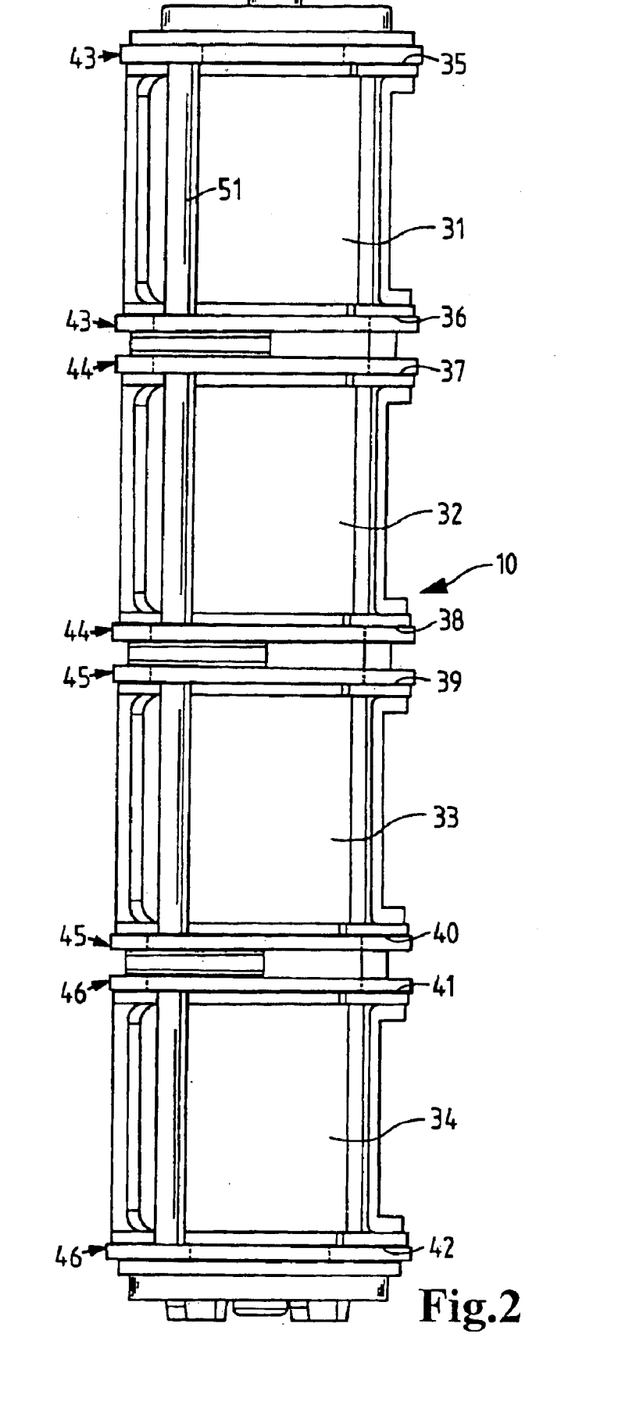
FIG. 2 shows a detail view of the switching cylinder.

FIG. 2 shows a detail view of a switching cylinder 10. This switching cylinder has openings 31, 32, 33, 34 for the passage of the intake air. Grooves 35 to 42 are provided laterally of the openings. A sealing element in the form of a sealing cage 43–46 is inserted into each of these grooves.

Figure 3:
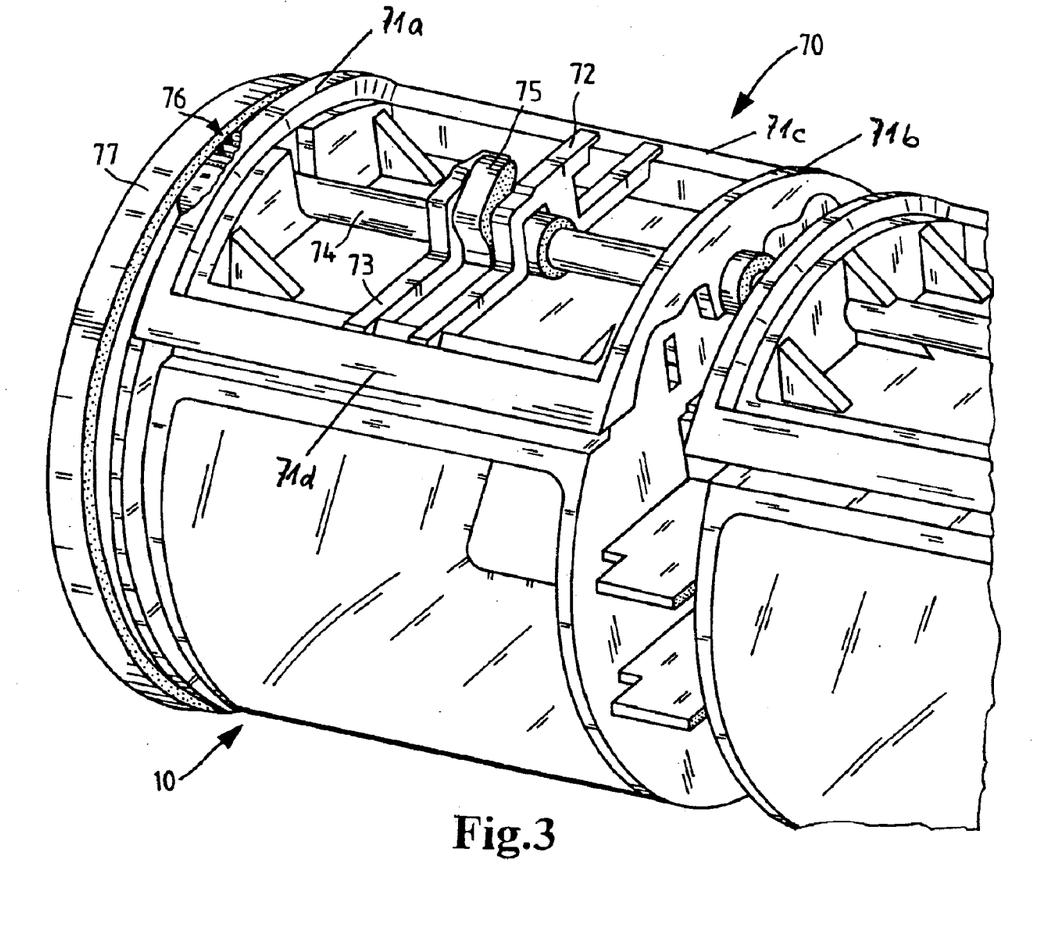
FIG. 3 is a perspective view of the sealing system.

The detail illustration shown in FIG. 3 shows a sealing system 70, which is constructed in the form of a frame. The sealing system 70 has two webs 72, 73 which extend past a camshaft 74. The webs 72, 73 are connected to and controlled by cams 75, which are attached to and turned by the camshaft 74 in such a way that the webs 72 and 73 can be raised or lowered. The control occurs in such a way that the sealing system is moved radially outward and/or inward. The camshaft 74 has teeth 76 on its outer end, which engage a gear ring 77. As soon as a torque acts on the switching cylinder 10, the camshaft rotates, and the sealing system is thus moved radially. The sealing system 70 is supported by the webs 72, 73. This sealing system comprises two curved webs 71a, 71b which are connected via straight webs 71c, 71d. Together these four webs form a closed rectangular seal.

In the position shown in FIG. 3, the sealing system is pulled radially inward in the frame provided for the sealing system 70 and rests against the switching cylinder. In this position, uncontrolled movement of the sealing system is prevented.

Figure 4:
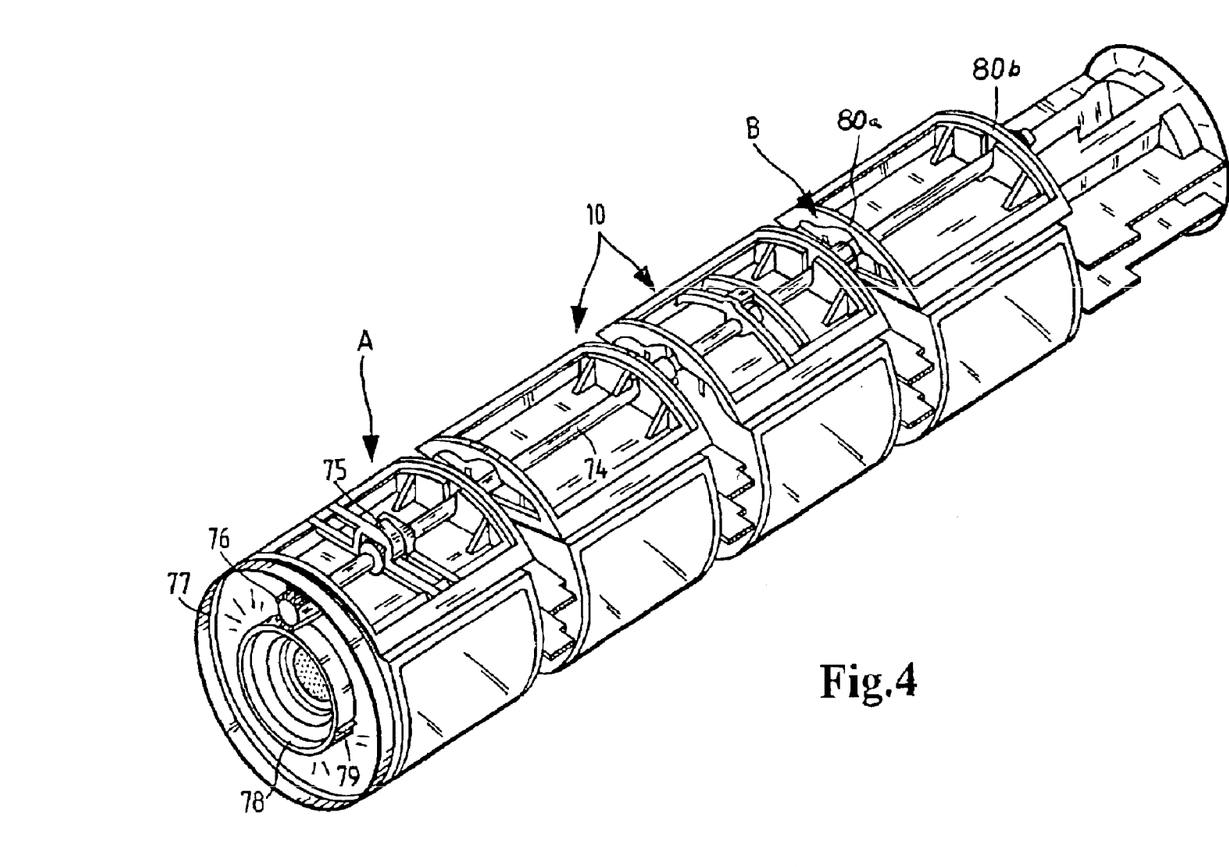
FIG. 4 shows two variants of the sealing system.

FIG. 4 shows two variants for moving the sealing system. Variant A is the version illustrated in FIG. 3. In this case, the inner gear ring 78 may be seen, which, when the switching cylinder is rotated by 90° from the position shown, causes a radial outward movement of the sealing system via the teeth 79 provided on the gear ring.

Variant B shows a sealing system which has no support webs, but instead is controlled by the action of camshaft 74 on the curved seal elements 80a and 80b. For this purpose, the camshaft is appropriately shaped adjacent these curved elements. For example, cams or rocker arms may be positioned there which cause a movement of the sealing system.

Figure 5A:
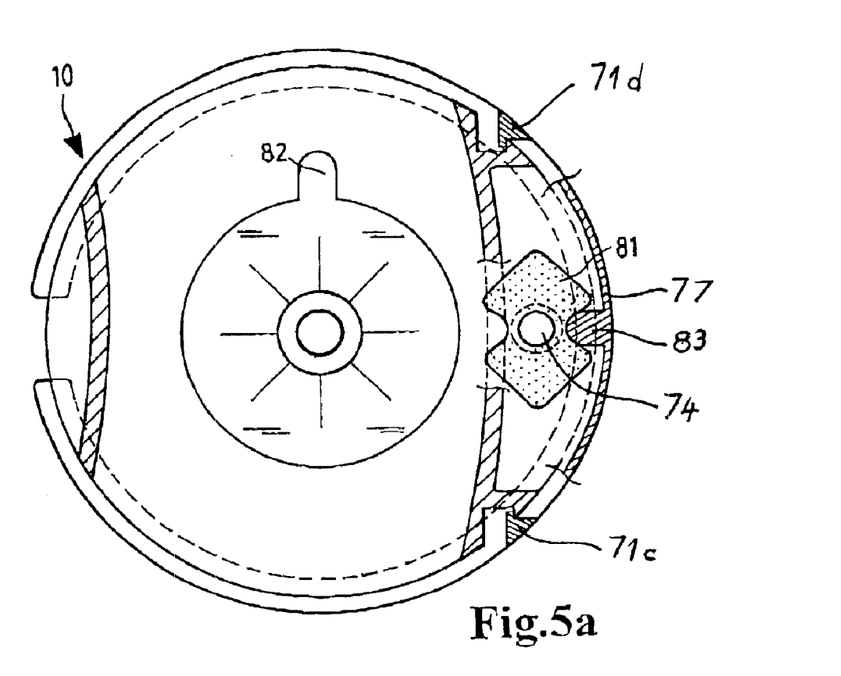
FIGS. 5a and 5b illustrate the control of the sealing system via an internal cam.
Figure 5B:
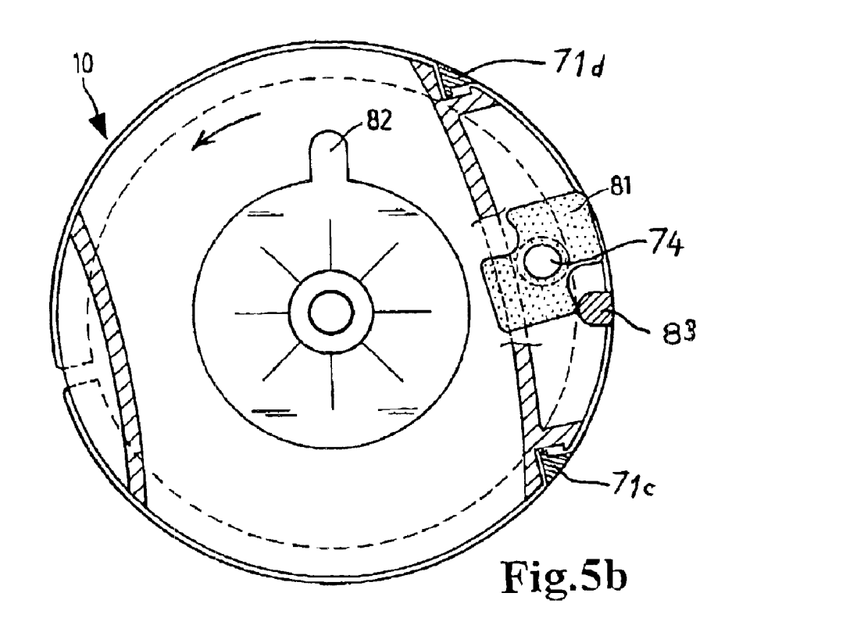

FIGS. 5a and 5b are detail views which each show the movement cycle of the sealing system upon rotation of the switching cylinder 10 in the direction of the arrow. The camshaft 74 can be clearly seen in FIGS. 5a and 5b. On camshaft 74 there is a rocker arm 81 which engages the tooth of gear ring 77 and thus turns the camshaft 74, thereby serving the same function at the gear teeth 76 shown in FIG. 4. FIG. 5a shows the sealing system in the closed position in which the seal webs 71a through 71d are urged radially outwardly by the cam 75 (See FIG. 3) into contact with the inner wall of the pipe. As soon as the switching cylinder is rotated in the direction of the arrow, the rocker arm 81 on camshaft 74 is pivoted by the single tooth 83 of outer gear ring 77. This turns the camshaft 74 and pivots the cam 75 (See FIG. 3) so that the sealing system 71c, 71d is thereby pulled back from the extended, closed position shown in FIG. 5a to the retracted, open position shown in FIG. 5b.

Figure 6A:
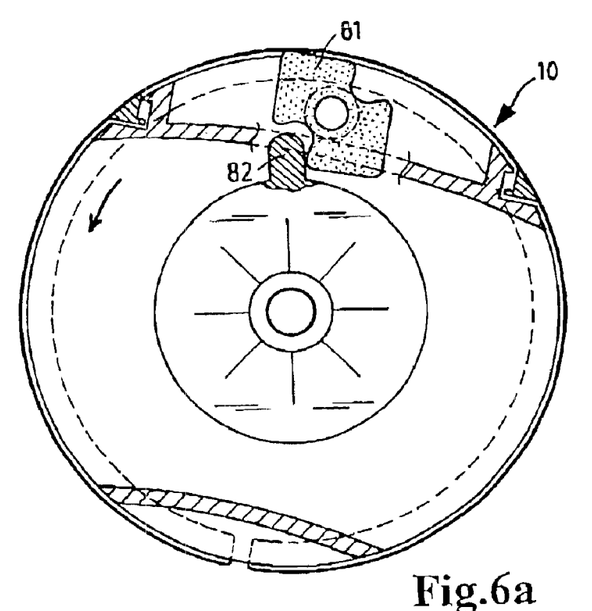
FIGS. 6a and 6b illustrate the control of the sealing system via an external cam.
Figure 6B:
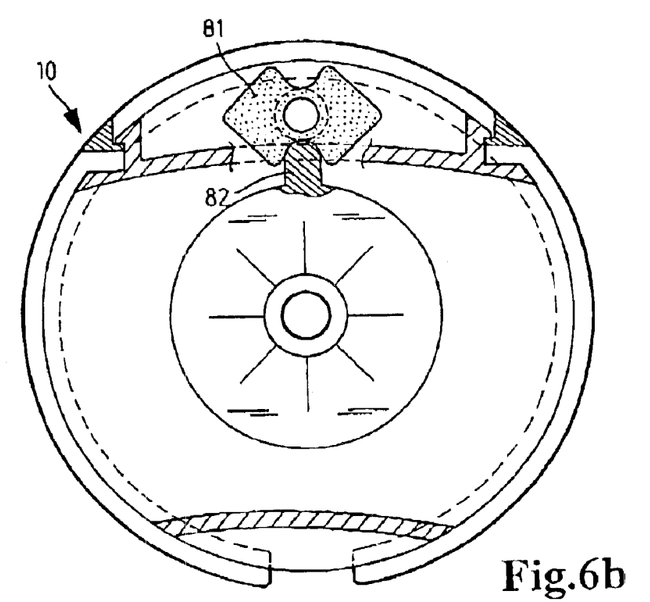

FIGS. 6a and 6b show the engagement of the rocker arm 81 on camshaft 74 with a fixed inner gear tooth 82 as the switching cylinder is turned further. As soon as the switching cylinder 10 engages this gear tooth 82 with the rocker arm 81, the camshaft 74 again pivots, thereby turning cam 75 (See FIG. 3) and leading in the end position to the sealing lips 71c and 71d being extended again as shown in FIG. 6b and pressed against the pipe wall, thereby ensuring reliable sealing of a through passage.

Thus, in FIGS. 5a and 6b, the cam (See FIG. 3) is turned so that the sealing members are in the extended position in which they lie against the pipe wall, and in FIGS. 5b and 6a, the cam is turned so that the sealing members are in the retracted, open position in which a gap is formed between the sealing members and the pipe wall.

Figure 7A:
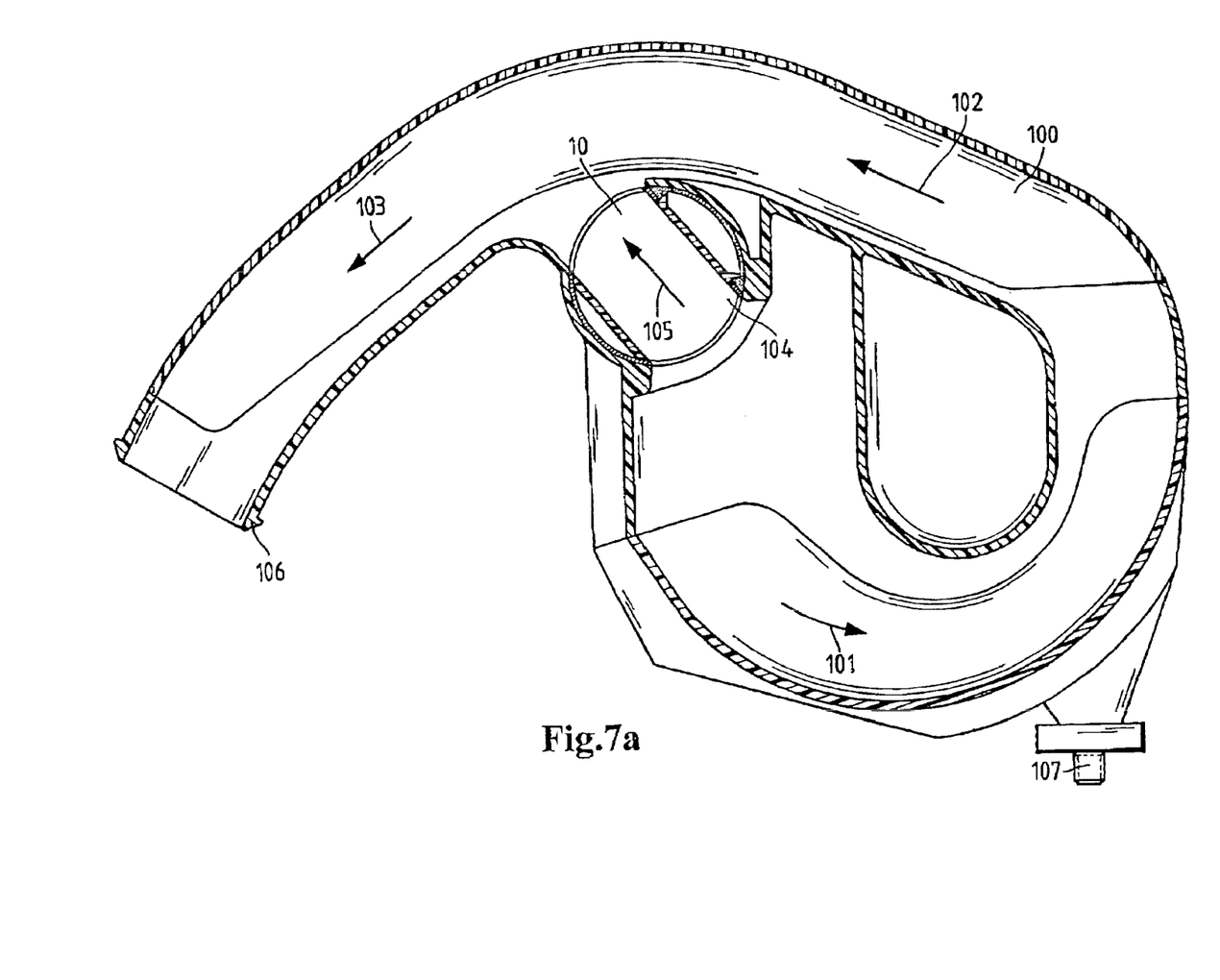
FIG. 7a shows the use of a switching cylinder in an intake system having an open output passage.

FIG. 7a shows an intake system made of plastic (i.e., synthetic resin) components. The intake system comprises a long torque passage 100 for air supplied to an internal combustion engine (not shown) as indicated by the arrows 101, 102, 103. In addition, a shorter, so-called performance passage 104 is provided, through which air flows through a switching cylinder 10 as indicated by arrow 105 to the internal combustion engine. The flange region 106 of the intake system is attached to the cylinder head of the internal combustion engine. The intake system is attached to a support member (not shown) by a screw attachment 107. The position of the switching cylinder 10 shown in FIG. 7*a* indicates that the internal combustion engine is in the higher speed range.

FIG. 7*b* shows the switching cylinder 10 in a closed position. This is necessary when the internal combustion engine operates in the lower speed range with a high torque. Switching between these two positions is carried out as illustrated and described above in connection with FIGS. 5 and 6.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

What is claimed is:

1. A valve for opening and closing a pipe of an air intake system of a multicylinder internal combustion engine having a air distribution chamber and a plurality of individual intake pipes positioned next to one another and leading from the air distribution chamber to a flange attached to a cylinder head of the engine, said valve comprising a switching cylinder positioned in an individual intake pipe to close or open the individual intake pipe, wherein the switching cylinder is provided with a sealing system mounted so as to be radially moveable such that when the switching cylinder is in a closed position, the sealing system is extended radially outwardly and pressed against an inner wall of the pipe to form a seal, and when the switching cylinder is in an open position and while the switching cylinder is pivoting between the closed position and the open position, the sealing system is retracted radially inwardly to form a gap between the sealing system and the pipe inner wall.

2. A valve according to claim 1, wherein the sealing system comprises at least two, parallel sealing strips having ends connected to curved sealing elements, and the sealing strips and the curved elements are extendably and retractably mounted in grooves on the switching cylinder.

3. A valve according to claim 2, wherein the sealing strips and curved elements are formed of a resilient elastomer.

4. A valve according to claim 3, wherein the sealing strips are provided with a peripheral sealing lip or additional seal, and the peripheral sealing lips or the additional seal are produced by a two-component injection molding process.

5. A valve for opening and closing a pipe, wherein the valve comprises a switching cylinder provided with a sealing system mounted so as to be radially moveable such that when the switching cylinder is in a closed position, the sealing system is extended radially outwardly and pressed against an inner wall of the pipe to form a seal, and when the switching cylinder is in an open position and while the switching cylinder is pivoting between the closed position and the open position, the sealing system is retracted radially inwardly to form a gap between the sealing system and the pipe inner wall; and the radial extension and retraction of the sealing system are controlled by a camshaft.

6. A valve according to claim 5, wherein the camshaft is provided with teeth which engage a gear ring which is fixed in position relative to the switching cylinder, and the engagement of the camshaft teeth with the fixed gear ring causes the camshaft to rotate when the switching cylinder is turned to the closed position.

7. A valve according to claim 5, wherein the camshaft is provided with a rocker arm which engages a control element which is fixed in position relative to the switching cylinder, and the engagement of the rocker arm with the control element causes the camshaft to rotate when the switching cylinder is turned to the closed position.

* * * * *